Figure 1:
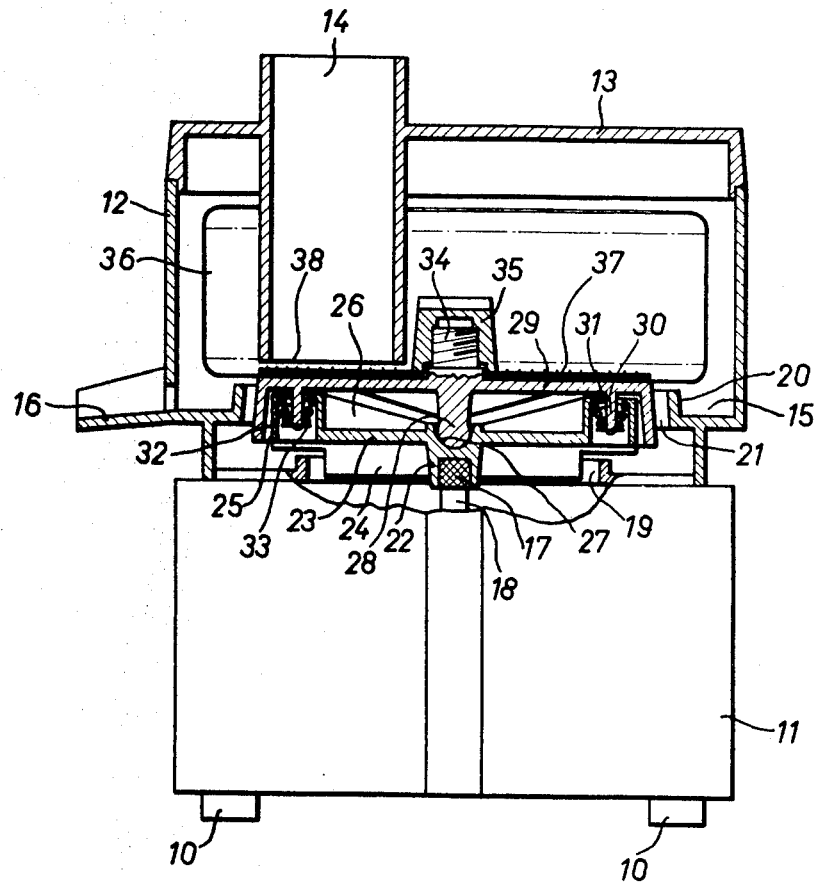

United States Patent

[11] 3,534,793

[72] Inventor Max Wunderlin
  Mannedorf, Switzerland
[21] Appl. No. 796,816
[22] Filed Feb. 5, 1969
[45] Patented Oct. 20, 1970
[73] Assignee Turmix A.G.,
  Zurich, Switzerland
[32] Priority Feb. 8, 1968
[33] Switzerland
[31] 1,883/68

[54] MACHINE FOR EXTRACTING JUICE FROM FRUITS OR VEGETABLES
5 Claims, 2 Drawing Figs.
[52] U.S. Cl. .................................... 146/76, 146/3
[51] Int. Cl. .................................... A23n 1/02, A47j 19/00
[50] Field of Search ........................... 146/3.8, 3, 3.11, 3.13, 76.1

[56] References Cited
UNITED STATES PATENTS
2,305,193  12/1942  Reynolds et al. ............. 146/76
3,407,858  10/1968  Smith et al. ................. 146/76

Primary Examiner—Willie G. Abercrombie
Attorney—Watson, Cole, Grindle and Watson ABSTRACT: A machine for extracting juice from fruits or vegetables having a raking device rotatably mounted in a casing and having a filler tube mounted to one side of the axes of rotation of the raking device. A drive shaft is connected to the raking device with a motor provided to rotate the shaft and raking device and an elastic coupling is mounted between the transmission shaft from the motor and the raking device to take care of any imbalance of a wire basket provided to catch the pulp and juice from the raking device.

Patented Oct. 20, 1970

3,534,793

Sheet 1 of 2

INVENTOR.
Max Wunderlin
BY
Watson, Cole, Grindle & Watson
Attys.

Patented Oct. 20, 1970

3,534,793

Sheet 2 of 2

INVENTOR.
Max Wunderlin
BY
Watson, Cole, Grindle & Watson
Attys.

MACHINE FOR EXTRACTING JUICE FROM FRUITS OR VEGETABLES

The present invention relates to a device for obtaining juice from fruits or vegetables with a raking arrangement rotatable eccentrically or concentrically in front of the mouth of a filler tube and driven by a motor by means of an elastic coupling, which device is in firm connection with a wire or other basket.

In the case of known devices of the mentioned type, the raking device developed as a raking disk rotates with a slight constant distance in front of the mouth of a filler tube. The fruit or vegetable parts fed to the device through said tube are comminuted by the raking arrangement and are thrown by the centrifugal force against the inside wall of the wire basket which has the shape of a cylinder casing, whereby by means of said centrifugal force, the juice is separated from the solid components of the matter which is to be juiced. Since the matter that is to be juiced is fed generally in a discontinuous manner, often a considerably uneven distribution of the solid components of the fruits and vegetables will result at the inside periphery of the wire basket and because of the high rpm a correspondingly strong imbalance may result. The latter results in undeniable considerable vibrations of the device, so that the process for obtaining juice will have to interrupted in most instances and the wire basket has to be emptied and cleaned before the latter will have reached the permissible degree of filling.

Essentially, an object of the invention consists in avoiding the disadvantage just described. In the case of an arrangement of the mentioned type, this will be achieved according to the invention and essentially by the fact, that one can bring about an enlargement of the distance between the exit of the filler tube and the sector of the raking arrangement adjoining the imbalance of the wire basket by the switching of an elastic coupling between the motor and the raking device whenever an imbalance of the wire basket occurs. Also the elasticity of the coupling will endeavor to bring the axis of symmetry of the raking device and of the wire basket into axial agreement with the driving shaft.

Figure 2:
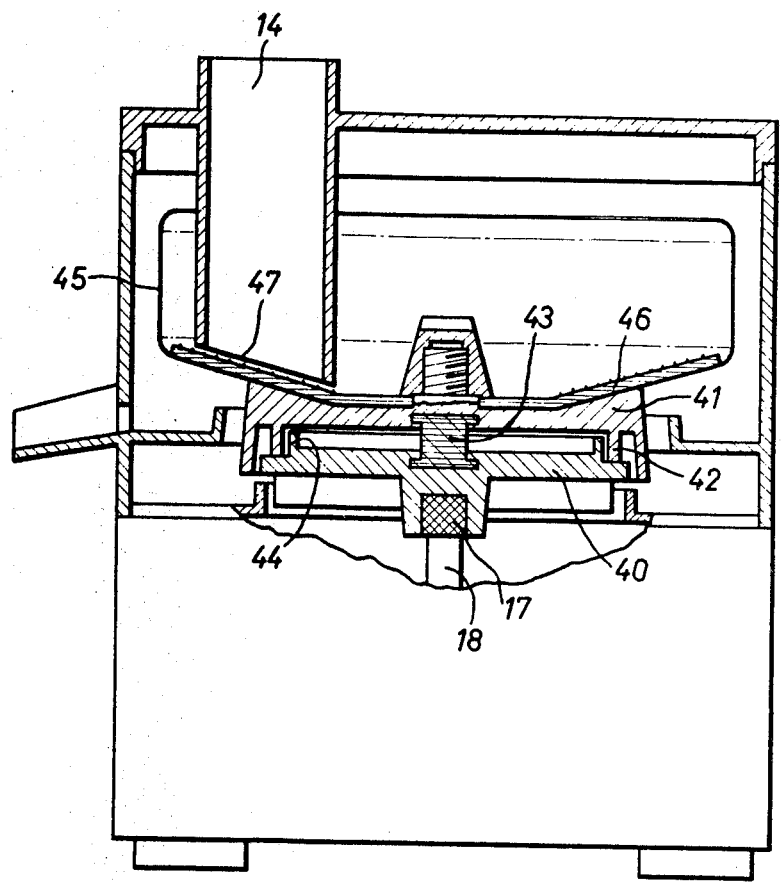

Further characteristics, advantages and details of the invention will become clear from the claims and from the succeeding description of two embodiments given by way of example of the device according to the invention, shown in the attached drawing in which;

FIG. 1 is a side elevation partly in section showing the device according to the invention, and FIG. 2 is a side elevation partly in section showing a modified structure.

The device or juicer according to FIG. 1 has a cylindrical-shaped housing 11 provided with feet 10, and in which an electric motor, not shown, has been installed. A juice collecting dish 12 is placed on the housing 11, which is closed by a cover 13, which has a filler tube 14 therethrough. The juice collecting dish 12 which has a collecting channel 15, and a beak-shaped exit channel 16 which with the cover 13, can be fixed in relation to the housing 11 by way of holding elements, not shown in the drawing.

One end 17 of the shaft 18 of the electric motor, located in the axis of the housing 11, projects from a central upper opening 19 in the housing 11 toward the juice collecting dish 12, which has a lower circular opening 21 limited by the inside edge 20 of the collecting channel 15. The hub 22 of a plate 23, which has the shape of a circular disk, has been firmly pressed onto the end 17 of the motor shaft 18 which has been provided with a knurled or rough surface. The plate 23, has wing ribs 24 for the ventilation of the motor, said ribs running radially on the side facing the motor, and is provided as well with a peripheral edge part 25 projecting upwardly with U-shaped cross section open in a downward direction. On its top side the plate 23 has been provided with radially running reinforcing ribs 26, and the top part of the hub 22 has a hemispherical seat 27 for the joint 28, having likewise a hemispherical-shaped end of a central centering projection, pointing downwards and being a second plate 29, which is arranged immediately above the first plate 23. The length of the centering projection 28 points downwards and has, at the same time, been selected in such a manner that, in case the planes of the plates lie parallel to one another, the upper plate 29 will have a slight distance from the peripheral edge part 25 of the lower plate 23. For the transmission of the rotating movement of the lower plate 23 to the upper plate 29, there are several driver pins 30 which project from the latter downwards, and which pierce opening 31 in the peripheral edge part 25 of the lower plate 23. The diameter of the opening 31 has been selected in such a size, that swinging movements of the upper plate 29, in relation to the lower plate 23, are possible without the driver pins 30 grazing the walls of the opening 31. The two plates 23 and 29, supported against each other in the ball bearing 27 and 28, have been united into an elastic coupling with angular movement by helical compression springs 32 which have been placed on each driver pin 30 from below and which are held in their prestressed condition by a stop disk 33, each attached to the lower end of its pin 30. The maximum deflection angle of said coupling is limited by the smaller distance between the peripheral edge part 25 of the lower plate 23 and the underside of the upper plate 29. Instead of the helical compression springs 32 which endeavor to bring the rotational axis of the raking device into an axial agreement with the motor shaft 18, one can also use elastic hollow bodies or similar devices made of rubber.

The top side of the plate 29 in its center has a threaded pin 34 projecting perpendicularly upwards and on which a nut 35 has been screwed on. A wire basket 36 and a flat raking disk 37 are pressed on its underside against the flat top side of the plate 29. The exit end 38 is a proper distance from the raking disk 37, so that said raking disk 37 will not graze or contact against the filler tube 14 arranged on the exit 38 eccentrically in relation to the raking disk 37 even if the wire basket 32 has an extremely oblique position in relation to the lower plate 23.

The method of use and operation of the device described is as follows: The material that is to be juiced is fed into the filler tube 14 and is pressed lightly against the revolving raking disk 37 which comminutes the material that is to be juiced, by means of a plug not shown in the drawing. The comminuted material is thrown against the perforated wall of the wire basket 36 by centrifugal force, whereby the juice is thrown against the cylindrical wall of the juice collecting dish 12 through the perforated holes and is collected in the collecting channel 15. The solid components of the material that is to be juiced are held back in the inside of the wire basket along its wall.

If because of some imprecision in fabrication or because of an uneven distribution of the comminuted material an imbalance occurs at the wire basket, then the latter exerts a pitching moment on the wire basket 36 connected with the upper plate in consequence of the thrust point of the wire basket being at a distance in an axial direction from the ball joint 27 and 28. The wire basket 36, because of the elastic coupling, will tilt toward that side on which the imbalance exists, and the raking disk 37 joins in this inclination. The revolving raking disk 37 thus shows the largest distance from the mouth 38 of the filler tube 14 in that sector of its raking surface which is closest to the imbalance of the wire basket and it shows the relatively smallest distance in that sector which is diametrically opposed thereto. Since the material filled into the filler tube 14 is not capable of following the rapid up and down movement of the raking surface, because of the relatively large mass inertia to which the plug that had been put on and especially also the hand which presses on the latter contribute, less material is raked together by that sector of the raking disk which is closest to the imbalance than by the raking disk sector which is diametrically opposed thereto. Since, furthermore, the mouth 38 of the filler tube 14 and the thrust point of the wire basket, viewed from the ball joint 27 and 28, lie on the same axial side, an automatic compensation of the imbalance or a reduction of the imbalance to a tolerable measure will be brought about in this manner and the initially mentioned undesirable vibrations will be avoided.

The embodiment of the device according to the invention, given by way of example and shown in FIG. 2, differs from the one described only in the development of the elastic coupling, the shape of the wire basket, the raking device and the exit of the filler tube, as well as in the method of operation. Therefore, only those details which deviate from the first embodiment will be explained in the following:

the device according to FIG. 2 shows a rotationally fixed lower plate 40 placed on the knurled end 17 of the motor shaft 18, on which an upper plate 41 rests. The contact surface of the two plates 40 and 41 is in the shape of a circular ring and is provided at the front surface as a concentric rib 42 on the plate 41 which is directed downwards, which rib 42 rests on the flat peripheral edge part of the lower plate 40. The two plates 40 and 41 are connected with one another by a centering body 43 which is elastic, as for example rubber, and which has been fixedly attached in corresponding recessions of the center parts of the two plates 40 and 41 opposing each other at a distance. The lower plate 40 has a concentric rib 44 projecting from its upper side, whose outside diameter is somewhat less than the inside diameter of the concentric rib 42 and projecting downwards from the upper plate 41. The two contact plates 40 and 41 can therefore be shifted counter to the elastic effect of the centering body 43 in any desired radial direction by a small distance in relation to one another. The stretch of shift at the same time is given by half the difference of the diameter of the cylindrical outside or inside surfaces of the concentric ribs 44 and 42 of the lower plate 40 or upper plate 41, acting as supporting surfaces. A wire basket 45 and a raking disk 46 have been placed on the upper plate 41, in an analogous manner as in the case of the first embodiment, whereby the part of the raking disk 46, which can be moved along and under the mouth 47 of the filler tube 14, has the shape of the jacket of a circular truncated cone, whose larger diameter points upwards. The distance of the edge of the mouth 47 from the raking surface of the raking disk 46, pointing inward, has been dimensioned in such a way that upon an extreme reciprocal shifting of the two plates 40 and 41 the raking disk 46 does not graze against the filler tube.

The method of use and operation of the device according to FIG. 2 differs in the following from that according to FIG. 1. If an imbalance of the wire basket occurs, then a radial shearing force in the direction of the resulting centrifugal force will act on the upper end part of the rubber elastic centering body 43. As a result thereof, the upper plate 41 is shifted in the corresponding radial direction in relation to the lower plate 40. This partial shifting will result in the fact, that the sector of the revolving raking disk which is closest to the imbalance of the wire basket has a larger distance from the mouth 47 of the filler tube than does the diametrically opposed sector, as a result of which a compensation or a reduction of the imbalance is accomplished analogously to the one occurring in the embodiment according to FIG. 1.

The advantage of the devices described consists essentially in that by the almost complete elimination of the imbalance, practically no vibrations occur. The described devices thus remain standing on their feet even during a prolonged operation without any need for them to be held manually and it will no longer be necessary to interrupt the extracting process after the shortest time in order to remove the solid components of the material that is to be juiced from the wire basket.

I claim:

1. A machine for extracting juice from fruits or vegetables comprising a raking device rotating eccentrically in front of a mouth of a filler tube, a motor to drive the raking device, a wire basket, an elastic coupling firmly connected with the wire basket so that upon an imbalance of the wire basket an increase in the distance between a mouth of the filler tube and a sector of the raking device adjoining the imbalance of the wire basket can be brought about by the elastic coupling which latter is switched between the motor and the raking device, and a driving shaft from the motor to the raking device, the elasticity of the coupling will tend to bring the axis of symmetry of the raking device and the wire basket into axial agreement with the driving shaft.

2. A machine according to claim 1, in which the elastic coupling is angularly movable and has a centering joint at an axial distance from a thrust point of the wire basket, the thrust point of the wire basket and the mouth of the filler tube viewed from the centering joint lying on the same axial side.

3. A machine according to claim 1, in which the coupling has two plates adjoining in an axial direction of which one carries the raking disk and the wire basket connected therewith, and the other plate is connected firmly and rotatably with the driving shaft, one plate having a centering projection mounted swivelably in each direction in the other plate, and in which drivers are provided for the transmission of the rotational movement from one plate to the other plate, and resilient elements are provided which engage each other at both plates and exert oppositely directed forces against them.

4. A machine according to claim 1, in which the elastic coupling has two cooperating plates shiftable in any desired radial direction in relation to one another which have been provided each with a concentric stop surface for the limitation of the path of shifting, and the plates are under the action of at least one elastic centering element, which will tend to bring the axes of the plates into agreement, and in which one of the plates carries the raking device provided with a raking surface directed toward the inside and having the shape of a jacket of a truncated cone and also carries the wire basket connected with the raking device, and the other plate has been connected fixedly and rotatably with the driving shaft.

5. A machine according to claim 3, in which the resilient elements are in the form of springs.